United States Patent
Wagnitz et al.

(10) Patent No.: US 10,279,652 B2
(45) Date of Patent: May 7, 2019

(54) DOOR FOR AIR CONDITIONING UNIT

(71) Applicant: DENSO International America, Inc., Southfield, MI (US)

(72) Inventors: Jason Wagnitz, Pinckney, MI (US); Mark Rothenberg, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 132 days.

(21) Appl. No.: 15/084,868

(22) Filed: Mar. 30, 2016

(65) Prior Publication Data

US 2017/0282681 A1 Oct. 5, 2017

(51) Int. Cl.
*B60H 1/00* (2006.01)

(52) U.S. Cl.
CPC ............ *B60H 1/00678* (2013.01); *B60H 2001/00707* (2013.01)

(58) Field of Classification Search
CPC .................................... B60H 1/00678
USPC ........................................ 454/143
See application file for complete search history.

(56) References Cited

U.S. PATENT DOCUMENTS

| | | | | |
|---|---|---|---|---|
| 4,893,426 A | * | 1/1990 | Bixler | F16B 7/20 403/299 |
| 5,584,098 A | * | 12/1996 | Koyama | B60H 1/0065 16/441 |
| 6,695,691 B1 | | 2/2004 | Le | |
| 2007/0293135 A1 | * | 12/2007 | Hori | B60H 1/00678 454/121 |
| 2010/0155015 A1 | * | 6/2010 | Hoehn | B60H 1/0005 165/42 |

FOREIGN PATENT DOCUMENTS

JP 2013-035379 A 2/2013

* cited by examiner

*Primary Examiner* — Steven B McAllister
*Assistant Examiner* — Allen R Schult

(57) ABSTRACT

A door for an air conditioning unit includes a door body, a shaft, and a locking portion. The door body includes a sleeve. The shaft is inserted into the sleeve. The locking portion is disposed in the sleeve and the shaft. The shaft is detachably engaged to the sleeve through the locking portion.

9 Claims, 6 Drawing Sheets

DOOR FOR AIR CONDITIONING UNIT

FIELD

The present disclosure relates to a door for an air conditioning unit.

BACKGROUND

This section provides background information related to the present disclosure which is not necessarily prior art.

Vehicles are known to incorporate a heating, ventilation, and air conditioning (HVAC) systems to improve the comfort of the people within the passenger compartment of the vehicle. The HVAC systems heat and cool air blown through a HVAC unit using a heating heat exchanger and/or a cooling heat exchanger.

Such a HVAC unit includes a case defining a flow passage therein and at least one door for controlling air flowing though the flow passage. Typically, the door includes a body and a shaft, which are integrally formed, and the door is rotatably disposed in the case through the shaft to selectively open and close an inlet defined in the case.

SUMMARY

This section provides a general summary of the disclosure, and is not a comprehensive disclosure of its full scope or all of its features.

The present disclosure provides a door for an air conditioning unit including a door body, a shaft, and a locking portion. The door body includes a sleeve. The shaft is inserted into the sleeve. The locking portion is disposed in the sleeve and the shaft. The shaft is detachably engaged to the sleeve through the locking portion.

The door of the present disclosure includes the door body and the shaft that are separately formed, and the locking portion detachably engages the shaft to the sleeve. Therefore, flexible assembling can be realized through two-part configuration of the door.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
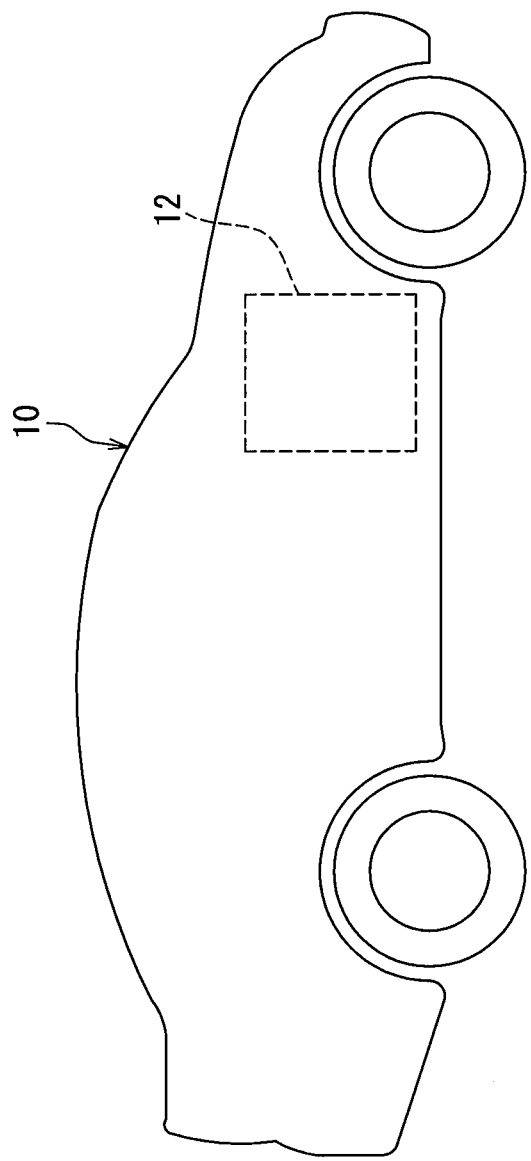
FIG. 1 is a side view of a vehicle with a HVAC unit in accordance with the present disclosure schematically illustrated therein.

A plurality of embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts may be combined. The embodiments may be partially combined even if it is not explicitly described that the embodiments may be combined, provided there is no harm in the combination.

First Embodiment

With reference to FIG. 1, a vehicle 10 incorporating a HVAC unit (air conditioning unit) 12 in accordance with the present disclosure is illustrated. The HVAC unit 12 is typically disposed within a dashboard of the vehicle 10 and either cools or warms air flowing through the HVAC unit 12. In order to cool the air, the HVAC unit 12 houses an evaporator, whereas, in order to heat the air, the HVAC unit 12 houses a heating heat exchanger, both of which are not illustrated.

Figure 2:
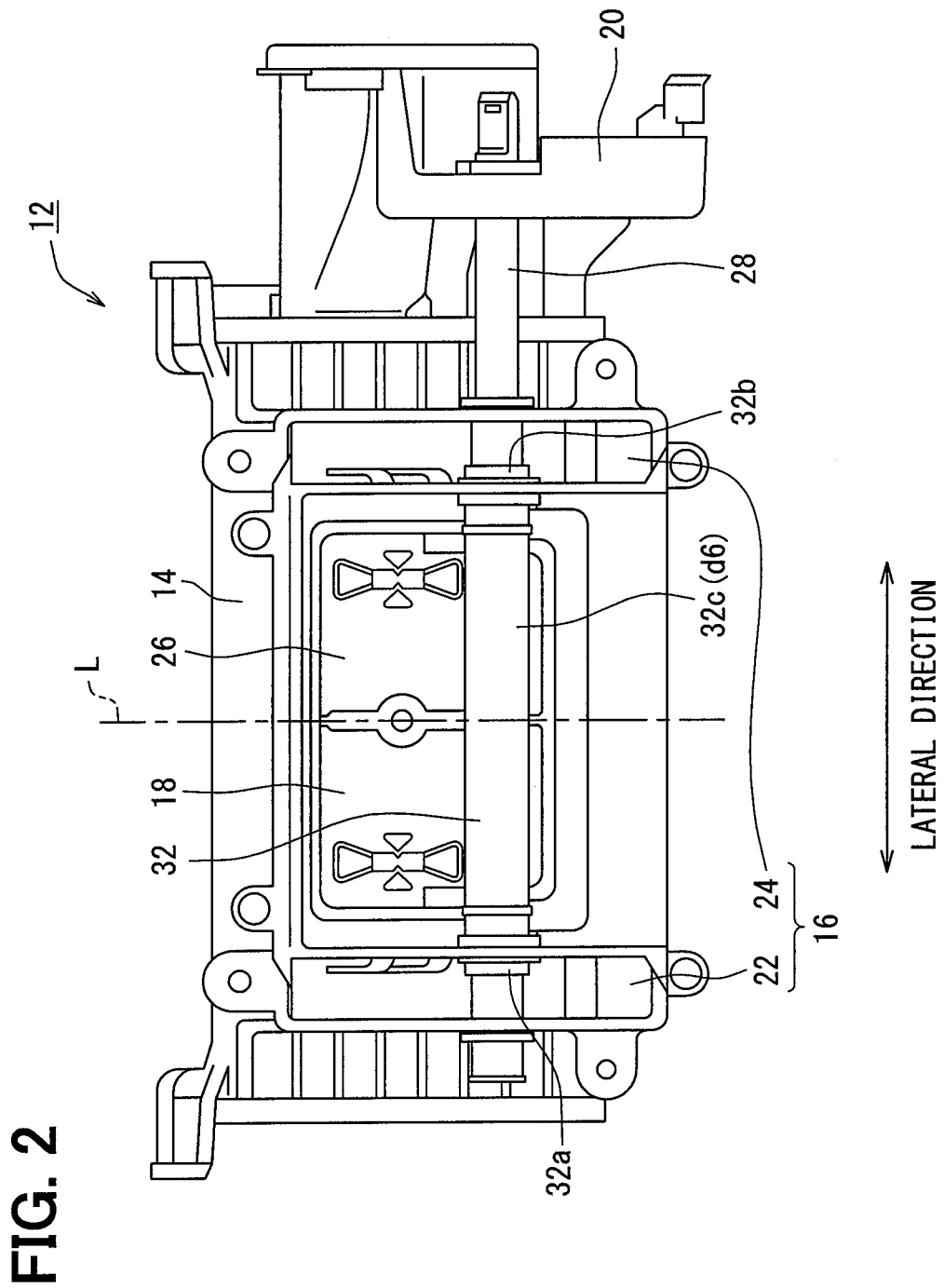
FIG. 2 is a plane view of the HVAC unit illustrated in FIG. 1.

The HVAC unit 12 generally includes a case 14, a supporting frame 16, and a door 18. The HVAC unit 12 also includes a servo motor (actuator) 20 attached to the case 14 to rotate the door 18. The case 14 defines an air passage (not shown) therein and an outlet (not shown), such as a foot outlet, a face outlet or the like, is open at one side surface of the case 14. In the present embodiment, the outlet has a rectangular shape elongated in one direction (hereinafter "lateral direction" as shown in FIG. 2), although other shapes of the outlet may be used.

The supporting frame 16 is disposed on the side surface of the case 14 and is configured to rotatably support the door 18. The supporting frame 16 includes a first frame portion 22 and a second frame portion 24, and the first and second frame portions 22, 24 are arranged along opposing edges of the outlet in the lateral direction. In other words, the first frame portion 22 and the second frame portion 24 are arranged to interpose the outlet therebetween in the lateral direction.

The door 18 includes a door body 26 and a shaft 28 that are separately formed. The shaft 28 is detachably engaged to the door body 26 through a locking portion 30, which is described later. The door body 26 is a rectangular plate having substantially the same shape and sectional area as the outlet of the case 14. The door body 26 includes a sleeve 32 having a cylindrical shape. As shown in FIG. 2, the door body 26 has a symmetric shape with respect to a symmetric line L that extends along the radial direction of the sleeve 32. The sleeve 32 defines an insertion hole therein extending along an axial direction of the sleeve 32. The axial direction of the sleeve 32 is aligned with the lateral direction when the door 18 is disposed in the case 14.

Figure 3:
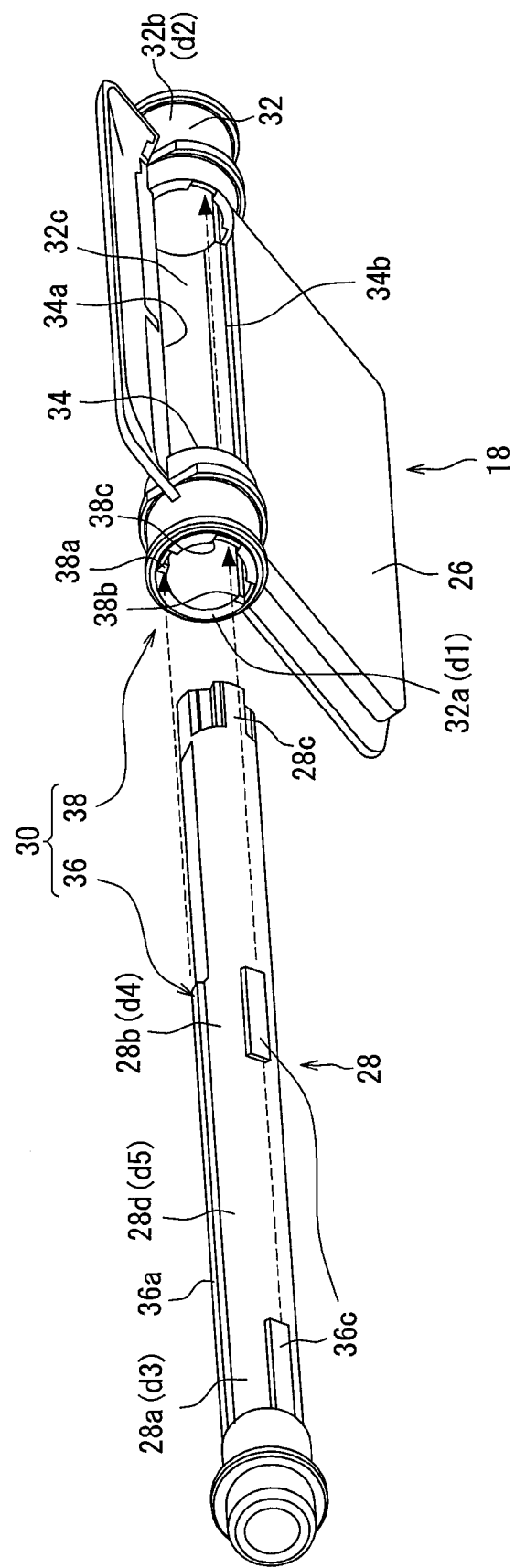
FIG. 3 is an exploded perspective view of a door.

The sleeve 32 has a portion as an opening 34 that is open in a radial direction of the sleeve 32. The opening 34 may be formed by cutting a particular region of a cylindrical wall of the sleeve 32. The opening 34 includes a first edge 34a and a second edge 34b that are opposite to each other in a circumferential direction of the sleeve 32. Both the first and second edges 34a, 34b extend along the axial direction of the sleeve 32. The sleeve 32 has a first end 32a (the left side in FIG. 2) and a second end 32b (the right side in FIG. 2) in the axial direction. Referring to FIG. 3, the first end 32a has an internal diameter d1 that is greater than the internal diameter d2 of the second end 32b (i.e., d1>d2).

The shaft 28 has an elongated shape extending along an axial direction thereof, i.e., along the lateral direction when the door 18 is disposed in the case 14. The shaft 28 is coupled with the door body 26 by being inserted into the sleeve 32. The shaft 28 includes a first portion 28a, a second portion 28b, and a third portion 28c. The first portion 28a is configured to form one end of the shaft 28 and is positioned inside the first end 32a of the sleeve 32 when the shaft 28 is inserted into the sleeve 32. The second portion 28b is a middle portion of the shaft 28 and is positioned inside the second end 32b of the sleeve 32 when the shaft 28 is inserted into the sleeve 32. The third portion 28c is configured to form the other end of the shaft 28. The third portion 28c of the shaft 28 is connected to the servo motor 20 that is controlled by an air conditioning unit (not shown).

With reference to FIG. 3, the first portion 28a has an external diameter d3 equal to or less than the internal diameter d1 of the first end 32a of the sleeve 32 and greater than the internal diameter d2 of the second end 32b of the sleeve 32 (i.e., d2<d3=<d1). The second portion 28b has an external diameter d4 equal to or less than the internal diameter d2 of the second end 32b of the sleeve 32 and less than the internal diameter d1 of the first end 32a of the sleeve 32 (i.e., d4=<d2<d1). Thus, the external diameter d3 of the first portion 28a is greater than the external diameter d4 of the second portion 28b. In the present embodiment, an intermediate portion 28d of the shaft 28 between the first portion 28a and the second portion 28b has an external diameter d5 that is equal to the external diameter d3 of the first portion 28a. The external diameter d5 of the intermediate portion 28d is set to be less than an internal diameter d6 of a main portion 32c of the sleeve 32 between the first end 32a and the second end 32b (i.e., d5<d6). As a result, a space S is formed between the internal surface of the sleeve 32 and the shaft 28 when the shaft 28 is inserted into the sleeve 32 (see FIG. 5). It should be noted that the third portion 28c has an external diameter equal to that of the second portion 28b. Alternatively, the third portion 28c may have a smaller diameter than that of the second portion 28b.

By setting the external diameters of the sleeve 32 and the internal diameters of the shaft 28 as described above, the shaft 28 is allowed to be inserted into the sleeve 32 from the first end 32a to the second end 32b of the sleeve 32. However, the shaft 28 is prohibited from being inserting into the sleeve 32 from the second end 32b to the first end 32a of the sleeve 32.

The locking portion 30 is configured to detachably connect the shaft 28 to the sleeve 32 when the shaft 28 is inserted into the sleeve 32. With reference to FIG. 3, the locking portion 30 generally includes a key member 36 and a groove member 38. In this embodiment, the key member 36 is integrally formed in the shaft 28 and the groove member 38 is integrally formed in the sleeve 32. Alternatively, the key member 36 and the groove member 38 may be separately formed in the shaft 28 and the sleeve 32.

The key member 36 includes a plurality of key elements 36a, 36b, 36c, more specifically, three key elements (a first key element 36a, a second key element 36b, and a third key element 36c). Similarly, the groove element 38 includes a plurality of groove elements 38a, 38b, 38c, more specifically, three groove elements (a first groove element 38a, a second groove element 38b, and a third groove element 38c), corresponding to the three key elements 36a, 36b, 36c.

Figure 5:
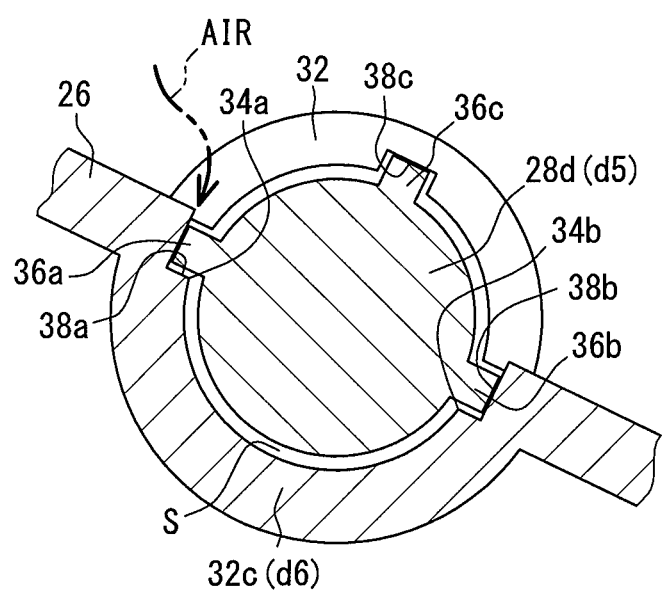
FIG. 5 is a cross-sectional view of the door.

The first, second, and third key elements 36a, 36b, 36c are formed in the shaft 28 to outwardly protrude from the shaft 28 in a radial direction of the shaft 28 and to extend along the axial direction of the shaft 28 between the first portion 28a and the second portion 28b (see FIG. 3). As shown in FIG. 5, the first key element 36a and the second key element 36b are opposite to each other in the radial direction of the shaft 28. The third key element 36c is positioned between the first key element 36a and the second key element 36b in a circumferential direction of the shaft 28. In other words, the third key element 36c is shifted by about 45° relative to both the first and second key elements 36a, 36b in the circumferential direction. As a result, the first, second, and third key elements 36a, 36b, 36c are arranged in a non-equidistant manner along the circumferential direction of the shaft 28. As shown in FIG. 3, the third key element 36c is split into two parts to extend in regions of the shaft 28 corresponding to the third groove element 38c as described below. More specifically, the third key element 36c is formed in the first portion 28a and the second portion 28b and not in the intermediate portion 28d of the shaft 28.

The first, second, and third groove elements 38a, 38b, 38c are formed in the sleeve 32 so as to be recessed from the internal surface of the sleeve 32 in the radial direction of the sleeve 32 and to extend along the axial direction of the sleeve 32. The first, second, and third groove elements 38a, 38b, 38c correspond to the first, second, and third key elements 36a, 36b, 36c, respectively. More specifically, the first groove element 38a and the second groove element 38b are opposite to each other in the radial direction, and the third groove element 38c is positioned between the first groove element 38a and the second groove element 38b in a circumferential direction of the sleeve 32. Similar to the key elements 36a, 36b, 36c, the first, second, and third groove elements 38a, 38b, 38c are arranged in a non-equidistant manner along the circumferential direction of the sleeve 32. Each of the groove elements 38a, 38b, 38c has a depth in the radial direction of the sleeve 32 that is substantially equal to the height of the corresponding key element 36a, 36b, 36c in the radial direction.

Figure 4:
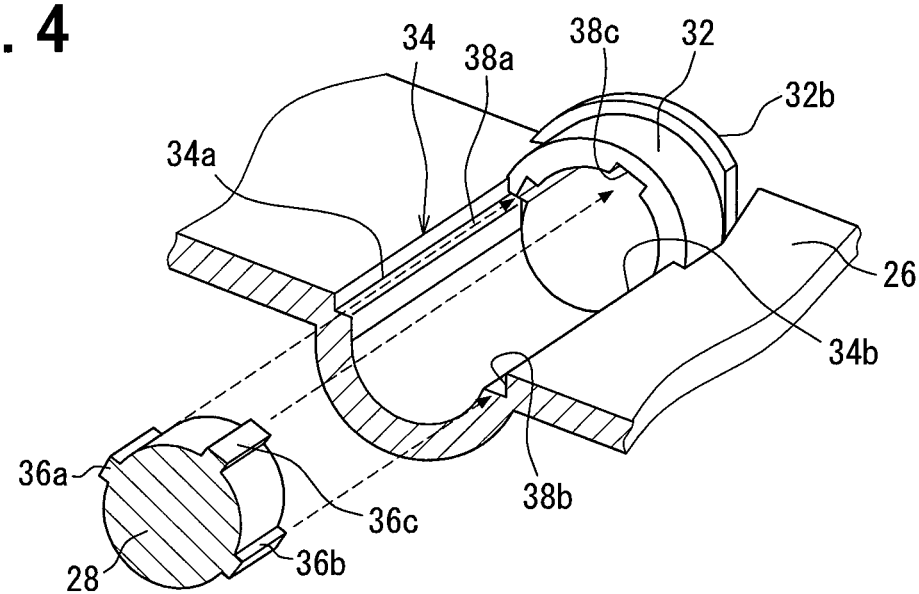
FIG. 4 is an exploded perspective view of a portion of the door.

As shown in FIG. 4, the first groove element 38a is formed to extend along the first edge 34a of the opening 34, and the second groove element 38b is formed to extend along the second edge 34b of the opening 34. In other words, the first groove element 38a and the second groove element 38b define the first edge 34a and the second edge 34b of the opening 34, respectively. Therefore, a portion of the first groove element 38a corresponding to the first edge 34a and a portion of the second groove element 38b corresponding to the second edge 34b are exposed to the air passage of the sleeve 32 through the opening 34 when the door 18 is disposed in the case 14. The third groove element 38c is formed in the inner surface of the sleeve 32 along the axial direction of the sleeve 32 to extend from both the first and second ends 32a, 32b to the opening 34. In other words, the third groove element 38c is separated into two parts to interpose the opening 34 therebetween.

When mounting the door 18 to the case 14, the door body 26 is set between the first frame portion 22 and the second frame portion 24. In this case 14, the first frame portion 22 and the second frame portion 24 hold the first end 32a and the second end 32b of the sleeve 32, respectively, while allowing rotation of the sleeve 32 (i.e., rotation of the door body 26). Then, the shaft 28 is inserted into the sleeve 32 along the lateral direction (i.e., the axial direction of the sleeve 32). In this case 14, the shaft 28 is allowed to be inserted into the sleeve 32 only from the first end 32a to the second end 32b. Therefore, it is possible to prohibit the shaft 28 from being inserted into the sleeve 32 in an improper direction (i.e., from the second end 32b to the first end 32a of the sleeve 32), which prevents misassembling of the door 18 to the case 14.

During the insertion of the shaft 28 into the sleeve 32, the first, second, and third key elements 36a, 36b, 36c slide along the first, second, and third groove elements 38a, 38b, 38c, respectively. Accordingly, the shaft 28 can be smoothly inserted into the sleeve 32 due to guidance by the groove elements 38a, 38b, 38c, which may contribute to efficient assembling process. After inserting the shaft 28 into the sleeve 32, each of the key elements 36a, 36b, 36c engages with the corresponding groove element 38a, 38b, 38c, whereby the shaft 28 is detachably connected to the sleeve 32 through the locking portion 30. In addition, the orientation of the shaft 28 with respect to the sleeve 32 is locked through the engagement between the key elements 36a, 36b, 36c and the groove elements 38a, 38b, 38c. In this way, the door 18 is mounted to the case 14 by assembling the door body 26 and the shaft 28. Therefore, flexible assembling can be realized through two-part configuration of the door 18. In contrast, if the door body 26 and the shaft 28 are integrally formed (i.e., one-part configuration), the flexibility of assembling of the door 18 may be limited as compared to the present embodiment.

In the present embodiment, the key and groove pairs are arranged in a non-equidistant manner along the circumferential direction. Therefore, the shaft 28 is only allowed to be inserted into the sleeve 32 with a proper orientation with respect to the sleeve 32. Therefore, each of the first, second, and third key elements 36a, 36b, 36c can only be engaged with the proper corresponding groove element 38a, 38b, 38c.

A portion of the sleeve 32 is open through the opening 34 and the corresponding region of the third groove element 38c is eliminated. Therefore, material and weight saving of the shaft 28 and the sleeve 32 can be realized. When the door 18 is properly mounted to the case 14, the opening 34 and the corresponding regions of the first and second groove element 38bs are exposed to the air passage inside the case 14. Therefore, air flowing through the air passage may reach the opening 34 and the first and second groove elements 38a, 38b. Furthermore, when the shaft 28 is inserted into the sleeve 32, the space S is formed between the shaft 28 and the internal surface of the sleeve 32 as shown in FIG. 5. Therefore, if air flowing through the air passage enters into the first or second groove element 38a, 38b and flows through the space S, undesirable noisy sound would be generated by the air (i.e., air whistle occurs). However, according to the present embodiment, the first key element 36a and the second key element 36b extend into the first groove element 38a and the second groove element 38b, respectively. Thus, the space S between the shaft 28 and the sleeve 32 is covered (sealed) by the first and the second key elements 36a, 36b, thereby inhibiting air from flowing through the space S.

In the present embodiment, the door body 26 has a symmetric shape with respect to the symmetric line L as shown in FIG. 2. This symmetric design provides the commonality with the door 18 for both left and right hand vehicles.

Second Embodiment

Figure 6:
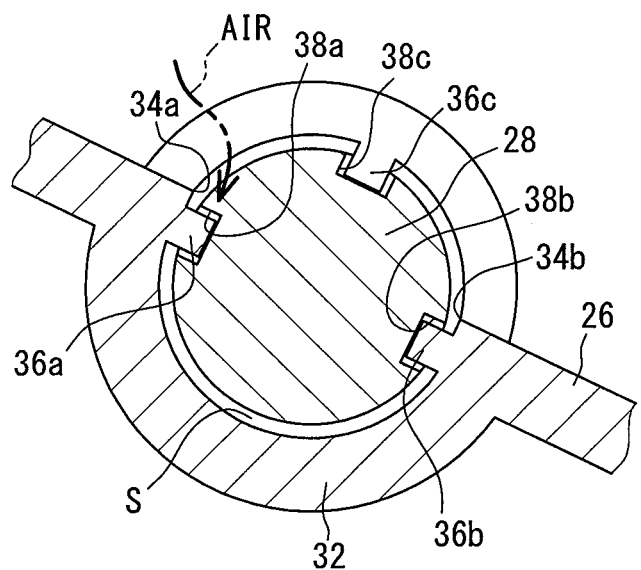
FIG. 6 is a cross-sectional view of a door in accordance with another aspect of the present disclosure.

Next, the HVAC unit 12 according to the second embodiment will be described with reference to FIG. 6. In the second embodiment, the first, second, and third key elements 36a, 36b, 36c inwardly protrude from the inner surface of the sleeve 32 in the radial direction, and the first, second, and third groove elements 38a, 38b, 38c are recessed from an outer surface of the shaft 28 in the radial direction. As with the first embodiment, the key and groove pairs are arranged in a non-equidistant manner.

In the second embodiment, the first key element 36a extends along the first edge 34a of the opening 34, and the second key element 36b extends along the second edge 34b of the opening 34. Further, the first groove element 38a extends along the first edge 34a of the opening 34 and the second groove element 38b extends along the second edge 34b of the opening 34 when the shaft 28 is inserted into the sleeve 32. Therefore, the first key element 36a and the second key element 36b covers (seals) the space S between the shaft 28 and the inner surface of the sleeve 32 while engaging with the first groove element 38a and the second groove element 38b, respectively. As a result, air is inhibited from flowing through the space S by the first and the second key elements 36a, 36b, and thus generation of the air whistle can be avoided.

Similar operations and advantages as described in the first embodiment can be attained according to the HVAC unit 12 of the second embodiment.

Third Embodiment

Figure 7:
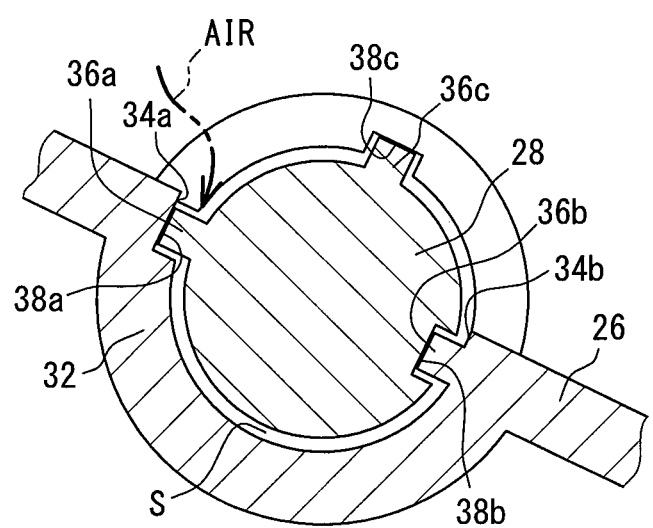
FIG. 7 is a cross-sectional view of a door in accordance with further another aspect of the present disclosure.

Next, the HVAC unit 12 according to the third embodiment will be described with reference to FIG. 7. In the third embodiment, the first key element 36a outwardly protrudes from the shaft 28 in the radial direction, and the second key element 36b inwardly protrudes from the inner surface of the sleeve 32 in the radial direction. Furthermore, the first groove element 38a is recessed from the inner surface of the sleeve 32 in the radial direction, and the second groove element 38b is recessed from the outer surface of the shaft 28 in the radial direction. As with the first embodiment, the third key element 36c outwardly protrudes from the shaft 28 in the radial direction, and the third groove element 38c is recessed from the inner surface of the sleeve 32 in the radial direction. Also, as with the first embodiment, the key and groove pairs are arranged in a non-equidistant manner.

In the third embodiment, the first groove element 38a extends in the axial direction of sleeve 32 along the first edge 34a of the opening 34, and the second key element 36b extends in the axial direction of the sleeve 32 along the second edge 34b of the opening 34. The first key element 36a extends along the first edge 34a of the opening 34 while engaging with the first groove element 38a when the shaft 28 is inserted into the sleeve 32. The second groove element 38b extends along the second edge 34b of the opening 34 while being engaged with the second key element 36b when the shaft 28 is inserted into the sleeve 32. As a result, air is inhibited from flowing through the space S by the first and the second key element 36bs, and thus generation of the air whistle can be avoided.

Similar operations and advantages as described in the first embodiment can be attained according to the HVAC unit 12 of the third embodiment.

Fourth Embodiment

Figure 8:
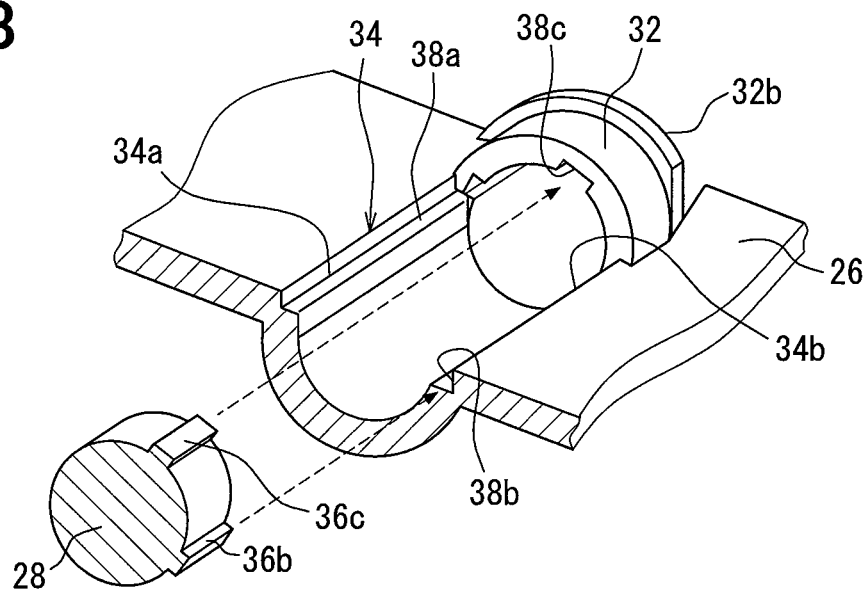
FIG. 8 is an exploded perspective view of a portion of a door in accordance with further another aspect of the present disclosure.
Figure 9:
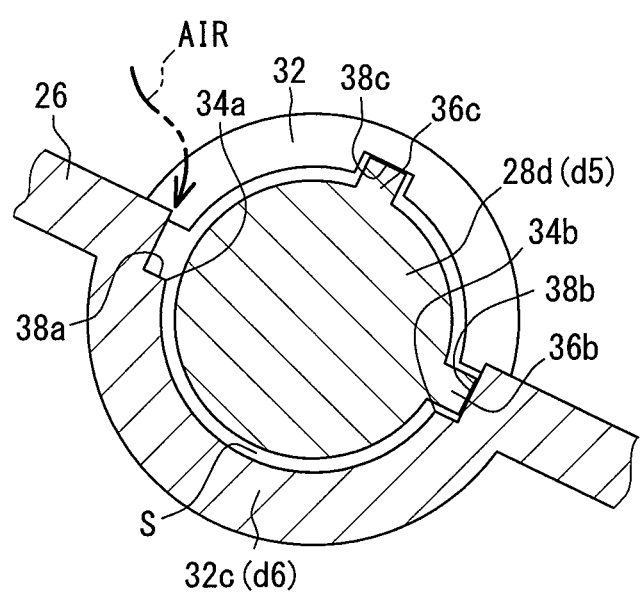
FIG. 9 is a cross-sectional view of the door in accordance with further another aspect of the present disclosure.

As shown in FIGS. 8 and 9, the first key element 36*a* may be omitted from the shaft 28. In this structure, the space S may be still covered (sealed) by the second key element 36*b* on one side, thereby inhibiting air from flowing through the space S. In this structure, the first groove element 38*a* may be also omitted.

(Modifications)

Although three key and groove pairs are provided in the first to third embodiments, the number of the pairs may be changeable as long as one pair is provided. In the above described embodiment, the locking portion 30 is integrally formed in the shaft 28 and the sleeve 32. However, the locking portion 30 (i.e., the key member 36 and the groove member 38) may be separately formed in the shaft 28 and the sleeve 32 and may be fixed thereto. In the above described embodiments, the door body 26 is formed into a rectangular shape, but the shape of the door body 26 is not limited to the rectangular shape.

In the structure of the first embodiment, in FIG. 3, the internal diameter d1 of the first end 32*a* of the sleeve 32 may be equal to the internal diameter d2 of the second end 32*b* of the sleeve 32 (i.e., d2=d1). Similarly, in this structure, the external diameter d3 of the first portion 28*a* of the shaft 28 may be equal to the external diameter d4 of the second portion 28*b* of the shaft 28 (i.e., d3=d4). In this structure, the shaft 28 and the sleeve 32 are generally symmetric in the axial direction. Therefore, the shaft 28 is allowed to be inserted into the sleeve 32 from either the first end 32*a* or the second end 32*b*. Thus, this structure may allow commonality of the components between a left-hand drive HVAC and a right-hand drive HVAC.

In the structure of the first embodiment, in FIG. 3, the external diameter d3 of the first portion 28*a* of the shaft 28 may be equal to the internal diameter d6 of the main portion 32*c* of the sleeve 32 (i.e., d3=d6). In this structure, the space S may not be formed between the first portion 28*a* of the shaft 28 and the main portion 32*c* of the sleeve 32.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

What is claimed is:

1. A door for an air conditioning unit, comprising:
a door body that includes a sleeve;
a shaft that is inserted into the sleeve; and
a locking portion disposed in the sleeve and the shaft, wherein
the shaft is detachably engaged to the sleeve through the locking portion, wherein
the locking portion includes a key member and a groove member,
the key member outwardly protrudes from the shaft in a radial direction of the shaft,
the groove member is recessed from an inner surface of the sleeve in a radial direction of the sleeve,
the key member slides along the groove member during insertion of the shaft into the sleeve, and
the key member and the groove member engage with each other to prohibit rotation of the shaft relative to the sleeve when the shaft is inserted into the sleeve, wherein
wherein said sleeve comprises a first sleeve portion connected to a second, distal sleeve portion by a channel, said channel comprising an opening in a radial direction that extends an axial length of said channel,
the groove member extends in an axial direction of the sleeve along a first edge of the opening, and
the key member extends along the first edge of the opening to cover a space formed between the shaft and the inner surface of the sleeve when the shaft is inserted into the sleeve, wherein the key member comprises an outer radial edge that contacts an inner radial edge of the groove member creating a seal to prevent air from flowing into a space between the outer radial edge and the inner surface of said channel.

2. The door according to claim 1, wherein
the key member includes a plurality of key elements,
the groove member includes a plurality of groove elements, each of the plurality of groove elements corresponding to a respective one of the plurality of key elements, and
the key and groove pairs are disposed in a non-equidistant manner along a circumferential direction.

3. The door according to claim 1, wherein
the key member includes a first key element and a second key element,
the groove member includes a first groove element and a second groove element, the first groove element extends in the axial direction of the sleeve along the first edge of the opening, the second groove element extends in the axial direction of the sleeve along a second edge of the opening, the second edge being opposite to the first edge in the circumferential direction of the sleeve, and the first key element and the second key element extend along the first edge and the second edge of the opening, respectively, to cover the space formed between the shaft and the inner surface of the sleeve when the shaft is inserted into the sleeve.

4. The door according to claim 3, wherein the key member includes a third key element, the groove member includes a third groove element that corresponds to the third key element, the sleeve includes a first end and a second end that are opposite to each other in the axial direction of the sleeve, the third groove element is formed in the inner surface of the sleeve along the axial direction of the sleeve from both the first and second ends to the opening, and the third key element is formed in regions of the shaft corresponding to the third groove element to engage with the third groove element when the shaft is inserted into the sleeve.

5. The door according to claim 1, wherein the sleeve includes a first end and a second end that are opposite to each other in the axial direction of the sleeve, the first end having an internal diameter greater than that of the second end, the shaft includes a first portion and a second portion, the first portion and the second portion being positioned inside the first end and the second end of the sleeve, respectively, when the shaft is inserted into the sleeve, the first portion has an external diameter equal to or less than the internal diameter of the first end and greater than the internal diameter of the second end, and the second portion has an external diameter equal to or less than the internal diameter of the second end and less than the internal diameter of the first end.

6. The door according to claim 1, wherein said key member is a first key member and said groove member is a first groove member, the locking portion further comprises a second key member and a second groove member, the second key member inwardly protrudes from an inner surface of the sleeve in a radial direction of the sleeve, the second groove member is recessed from an outer surface of the shaft in the radial direction of the shaft, the second key member slides along the second groove during insertion of the shaft into the sleeve, and the second key member and the second groove member engage with each other, thereby to prohibit rotation of the shaft relative to the sleeve when the shaft is inserted into the sleeve.

7. The door according to claim 6, wherein the first key and groove pair and the second key and groove pair are disposed in a non-equidistant manner along a circumferential direction.

8. The door according to claim 6, wherein the second key member extends in an axial direction of the sleeve along a second edge of the opening, the second edge being opposite to the first edge of the opening in a circumferential direction of the sleeve, and the second groove member extends along the second edge of the opening when the shaft is inserted into the sleeve, whereby the second key member covers the space formed between the shaft and the inner surface of the sleeve.

9. The door according to claim 1, wherein the door body has a symmetric shape with respect to a symmetric line that extends along the radial direction of the sleeve.

\* \* \* \* \*